United States Patent
Edwards et al.

(10) Patent No.: US 11,488,339 B2
(45) Date of Patent: Nov. 1, 2022

(54) SYSTEM AND METHOD FOR TRIGGERING ANIMATED PARALINGUAL BEHAVIOR FROM DIALOGUE

(71) Applicant: JALI INC., Toronto (CA)

(72) Inventors: Pif Edwards, Toronto (CA); Chris Landreth, Toronto (CA); Karan Singh, Toronto (CA); Eugene Fiume, Burnaby (CA)

(73) Assignee: JALI INC., Toronto (CA)

( * ) Notice: Subject to any disclaimer, the term of this patent is extended or adjusted under 35 U.S.C. 154(b) by 0 days.

(21) Appl. No.: 17/404,599

(22) Filed: Aug. 17, 2021

(65) Prior Publication Data

US 2022/0051463 A1    Feb. 17, 2022

Related U.S. Application Data

(60) Provisional application No. 63/066,633, filed on Aug. 17, 2020.

(51) Int. Cl.
```
G06T 13/00   (2011.01)
G06T 13/20   (2011.01)
G10L 15/02   (2006.01)
G10L 15/22   (2006.01)
G10L 15/26   (2006.01)
```

(52) U.S. Cl.
CPC .......... *G06T 13/205* (2013.01); *G10L 15/02* (2013.01); *G10L 15/22* (2013.01); *G10L 15/26* (2013.01); *G10L 2015/025* (2013.01)

(58) Field of Classification Search
CPC combination set(s) only.
See application file for complete search history.

(56) References Cited

U.S. PATENT DOCUMENTS 8,356,004 B2    1/2013   Jung et al.
2006/0122834 A1  6/2006   Bennett

OTHER PUBLICATIONS

International Search Report for PCT Application No. PCT/CA2021/051140 dated Dec. 3, 2021.
Written Opinion for PCT Application No. PCT/CA2021/051140 dated Dec. 3, 2021.
Pif Edwards, Chris Landreth, Eugene Fiume, and Karan Singh. 2016. JALI: An Animator-centric Viseme Model for Expressive Lip Synchronization. ACM Trans. Graph. 35, 4 (Jul. 2016), 127:1-127:11.

(Continued)

*Primary Examiner* — Vu B Hang
(74) *Attorney, Agent, or Firm* — Bhole IP Law; Anil Bhole; Marc Lampert

(57) ABSTRACT

A system and method for triggering animated paralingual behavior from dialogue. The method including: receiving a corpus of dialogue including a plurality of samples, each sample including dialogue with aligned sequences of phonemes or sub-phonemes; extracting properties of measured quantities for each sample; generating a statistical profile by statistically classifying the extracted properties as a function of each sequence of phonemes or sub-phonemes; receiving a stream of phonemes or sub-phonemes and triggering paralingual behavior when the properties of any of the phonemes or sub-phonemes deviate from the statistical profile beyond a predetermined threshold; outputting the triggered paralingual behavior for animation.

20 Claims, 5 Drawing Sheets

(56) References Cited

OTHER PUBLICATIONS

Paul Ekman. 2004. Emotional and conversational nonverbal signals. In Language, knowledge, and representation. Springer, 39-50.
Frederic I Parke and Keith Waters. 2008. Facial Animation. In Computer Facial Animation. A K Peters Ltd, 1-277.
Daniel Povey and et al. 2011. The Kaldi Speech Recognition Toolkit. IEEE 2011 Workshop on Automatic Speech Recognition and Understanding (Dec. 2011).

SYSTEM AND METHOD FOR TRIGGERING ANIMATED PARALINGUAL BEHAVIOR FROM DIALOGUE

TECHNICAL FIELD

The following relates generally to computer animation and more specifically to a system and method for triggering animated paralingual behavior from dialogue.

BACKGROUND

Humans extract considerable meaning from facial expressions and body language. Some of these behaviors are independent of dialogue. For example, an animated character can appear tense, angry, or bored even when no surrounding dialogue is present. In some cases, vocal dialogue can trigger non-verbal expression. Non-verbal activity that arises in response to linguistic activity can be referred to as paralingual behavior. These are often involuntary, and can include, for example, gestures, facial expressions, head motions (such as nodding or shaking), blinking, twitching, and the like. Some paralingual behaviors happen as a response to another character's dialogue; for example, raising a single eyebrow when something mystifying is said by the other character. Other paralingual behavior can be triggered based on a character's own speech cues, such as cues supplied by input vocal dialogue; for example:
- eyes blink rapidly and nostrils widen when the character says, "You're a liar".
- eyebrows raise, eyes widen, and forehead furrows when the character angrily says, "I don't believe you!".
- nose wrinkles when the character says, "That compost stinks."
- gaze changes when the character says, "I'm looking to my right."
- head nods vigorously when the character says, "I completely agree!".
- arms raise when the character says, "I won!".

SUMMARY

In an aspect, there is provided a method for triggering animated paralingual behavior from dialogue, the method executed on at least one processor of a computing device, the method comprising: receiving a corpus of dialogue comprising a plurality of samples, each sample comprising dialogue with aligned sequences of phonemes or sub-phonemes; extracting properties of measured quantities for each sample; generating a statistical profile by statistically classifying the extracted properties as a function of each sequence of phonemes or sub-phonemes; receiving a stream of phonemes or sub-phonemes and triggering paralingual behavior when the properties of any of the phonemes or sub-phonemes deviate from the statistical profile beyond a predetermined threshold; outputting the triggered paralingual behavior for animation.

In a particular case of the method, when the properties of any of the phonemes or sub-phonemes deviate from the statistical profile beyond a predetermined threshold comprises determining standard deviation between the phonemes or sub-phonemes and the statistical profile and triggering paralingual behavior when the standard deviation is above the predetermined threshold.

In another case of the method, the degree of statistical deviation is correlated with a degree of modulation for the paralingual behavior.

In yet another case of the method, the measured quantities comprise at least one of quantity, mean, maximum, minimum, and standard deviation.

In yet another case of the method, the properties comprise at least one of phonemes, vowels, consonants, sonorants, fricatives, plosives, intensity, pitch, and duration.

In yet another case of the method, the properties further comprise at least one of shimmer, jitter, duration, and overtones.

In yet another case of the method, each property is analyzed separately and the deviation from the statistical profile of each property is used to trigger a separate respective paralingual behavior.

In yet another case of the method, the method further comprising receiving the predetermined threshold from a user.

In yet another case of the method, outputting the triggered paralingual behavior further comprises determining and outputting animation curves for the triggered paralingual behavior that alter geometry of an animated character from a current state to the triggered paralingual behavior, hold the paralingual behavior for a period of time, and alter the geometry of the animated character back to a state prior to the paralingual behavior.

In yet another case of the method, triggering the paralingual behavior comprises selecting a paralingual behavior from a database of potential paralingual behaviors.

In another aspect, there is provided a system for triggering animated paralingual behavior from dialogue, the system having one or more processors and a data storage device, the one or more processors in communication with the data storage device, the one or more processors configured to execute: an input module to receive a corpus of dialogue comprising a plurality of samples, each sample comprising dialogue with aligned sequences of phonemes or sub-phonemes; an analysis module to extract properties of measured quantities for each sample and generate a statistical profile by statistically classifying the extracted properties as a function of each sequence of phonemes or sub-phonemes; a synthesis module to trigger paralingual behavior based on a stream of phonemes or sub-phonemes received by the input module when the properties of any of the phonemes or sub-phonemes deviate from the statistical profile beyond a predetermined threshold; and an output module to output the triggered paralingual behavior for animation.

In a particular case of the system, when the properties of any of the phonemes or sub-phonemes deviate from the statistical profile beyond a predetermined threshold comprises determining standard deviation between the phonemes or sub-phonemes and the statistical profile and triggering paralingual behavior when the standard deviation is above the predetermined threshold.

In another case of the system, the degree of statistical deviation is correlated with a degree of modulation for the paralingual behavior.

In yet another case of the system, the measured quantities comprise at least one of quantity, mean, maximum, minimum, and standard deviation.

In yet another case of the system, the properties comprise at least one of phonemes, vowels, consonants, sonorants, fricatives, plosives, intensity, pitch, and duration.

In yet another case of the system, the properties further comprise at least one of shimmer, jitter, duration, and overtones.

In yet another case of the system, each property is analyzed separately and the deviation from the statistical profile of each property is used to trigger a separate respective paralingual behavior.

In yet another case of the system, the input module further receives the predetermined threshold from a user.

In yet another case of the system, the synthesis module further determines animation curves for the triggered paralingual behavior that alter geometry of an animated character from a current state to the triggered paralingual behavior, hold the paralingual behavior for a period of time, and alter the geometry of the animated character back to a state prior to the paralingual behavior, and wherein the output module outputs the animation curves.

In yet another case of the system, triggering the paralingual behavior comprises selecting a paralingual behavior from a database of potential paralingual behaviors.

These and other aspects are contemplated and described herein. It will be appreciated that the foregoing summary sets out representative aspects of systems and methods to assist skilled readers in understanding the following detailed description.

BRIEF DESCRIPTION OF THE DRAWINGS

The features of the invention will become more apparent in the following detailed description in which reference is made to the appended drawings wherein.

DETAILED DESCRIPTION

Figure 1:
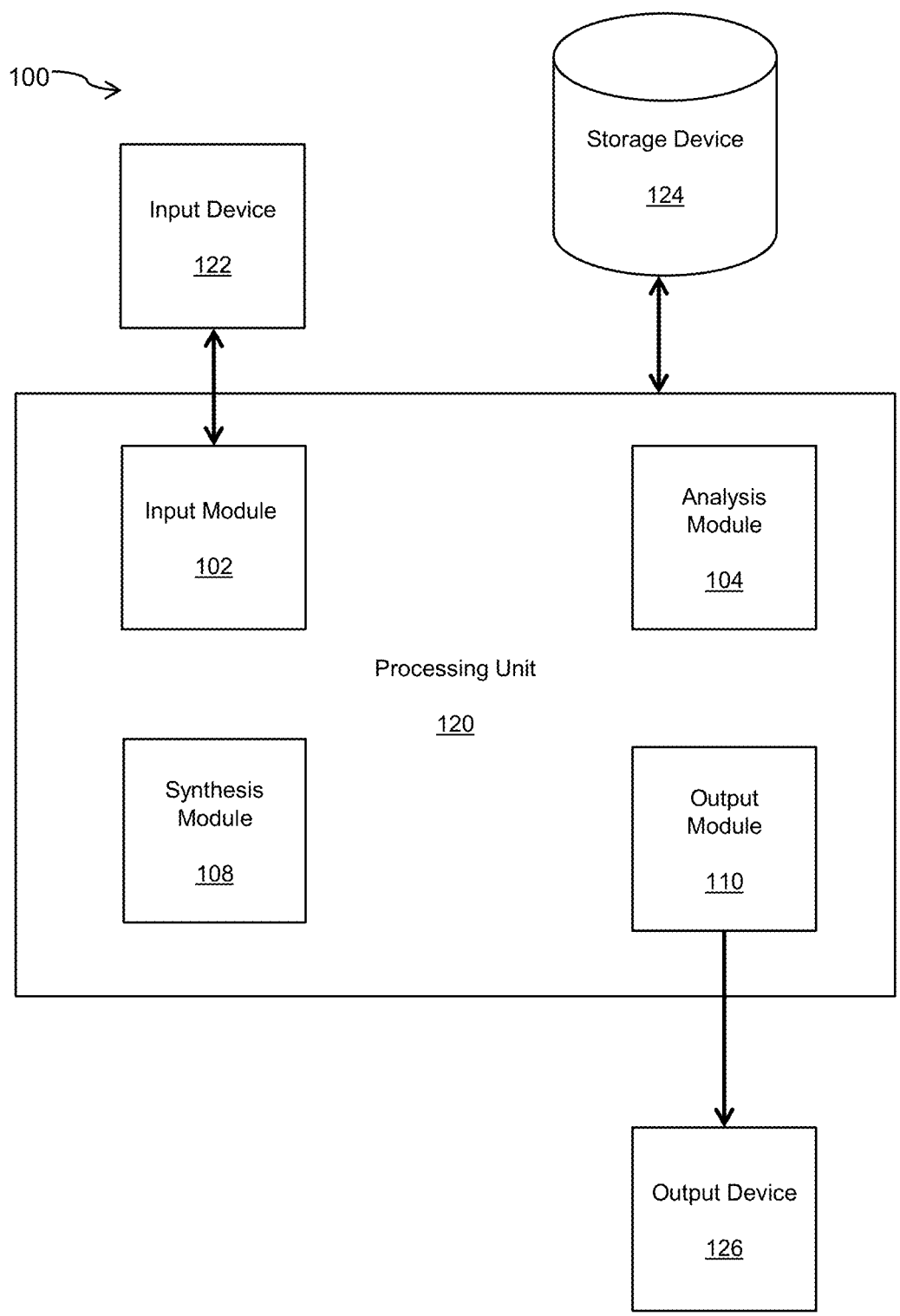
FIG. 1 is a diagram of a system for triggering animated paralingual behavior from dialogue, according to an embodiment.

Embodiments will now be described with reference to the figures. For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

For the purposes of the present disclosure, a paralingual behavior is an identifiable animated character motion that is correlated to a verbal utterance (typically speech), but generally does not play a role in the sound production of said utterance. Identifiable paralingual motions on the face, can include, blinks, brow raises, nose wrinkles, nostril flares, licked lips, and the like. Paralingual motions can also exist for other parts of a character's anatomy, like a character's head and neck may nod or shake, or their hands may gesticulate in connection to character speech. Non-human characters can also have other aspects of anatomy that move and articulate in correlation to verbal utterance; for example, animal ears, antennae, tentacles, and tails can be defined to move expressively in correlation to speech. Other fictional characters like robots can have further motions, such as wires, aerials and other components that can be bestowed with anthropomorphic attributes and animated using paralingual motions. For example, a robot aerial may extend or retract, similar to human eyebrows emphasizing speech.

While paralingual actions can bear correlation to speech, they can also be manifested by pauses, or periods of silence, in between verbal utterances. For example, blinking or licking lips to moisten eyes and lips, respectively, at the end of an utterance. In some cases, paralingual behavior can take place on a character independent of a speech or verbal utterance. For example, while a head nod can be triggered by character dialogue, the same paralingual behavior could be triggered for any number of reasons; such as due to an extended period of silence in the dialogue. In this way, the present embodiments consider paralingual behaviors that are correlated and performed in the context of utterances in a dialogue or periods of silence between utterances.

The present embodiments advantageously provide an approach to solving the technical problem of, given input audio and a phoneme alignment of human speech, determining how to create and synchronize additional paralingual non-verbal animated motions of the face, head, and body to support the specific speech input. The outputted paralingual behavior can be used in any suitable application; for example, in interactive settings, such as a digital human or avatar, or offline, such as for the precomputation of many hours of character animation for games or for film. The animated character subject to the paralingual behavior can be a human character or any other suitable form, such as an animal, a cartoon, a natural phenomenon like a talking cloud, or an abstraction to be animated. In some cases, the present embodiments can use aligned speech with audio and define candidate paralingual time intervals based on triggers; those candidate time intervals can be used to select paralingual behaviors that are compatible with the candidate interval.

The paralingual motions can be any anatomically constrained motions; be that anatomy fictional or based on human physiology. Non-limiting examples include motions of fingers (claws), hands, arms (tentacles), spine, chest (breathing), heart-rate, sweating, change in skin pallor, veins (becoming prominent or less prominent), salivating, eyes (eye-stalks, blinks, holding gaze, breaking gaze, or making eye contact), and the like. Paralingual motions can also include behaviors; non-limiting examples include sneezing, sniffing, licking lips, twitching, eye-rolls, and emphasises while speaking (e.g., brow raising for with increased volume), and the like. In some cases, the animated motions can be based on a 'character rig', such as those based on a facial action coding system (FACS), or a subset of FACS.

Turning to FIG. 1, a diagram of a system 100 for triggering animated paralingual behavior from dialogue, in accordance with an embodiment, is shown. The system 100 includes a processing unit 120, a storage device 124, an input device 122, and an output device 126. The processing unit 120 includes various interconnected elements and conceptual modules, including an input module 102, an analysis module 104, a synthesis module 108, and an output module 110. The processing unit 120 may be communicatively linked to the storage device 124 which may be loaded with data, for example, input data, phoneme data, animation data, or the like. In further embodiments, the above modules may be executed on two or more processors, may be executed on the input device 122 or output device 126, or may be combined in various combinations.

Figure 2:
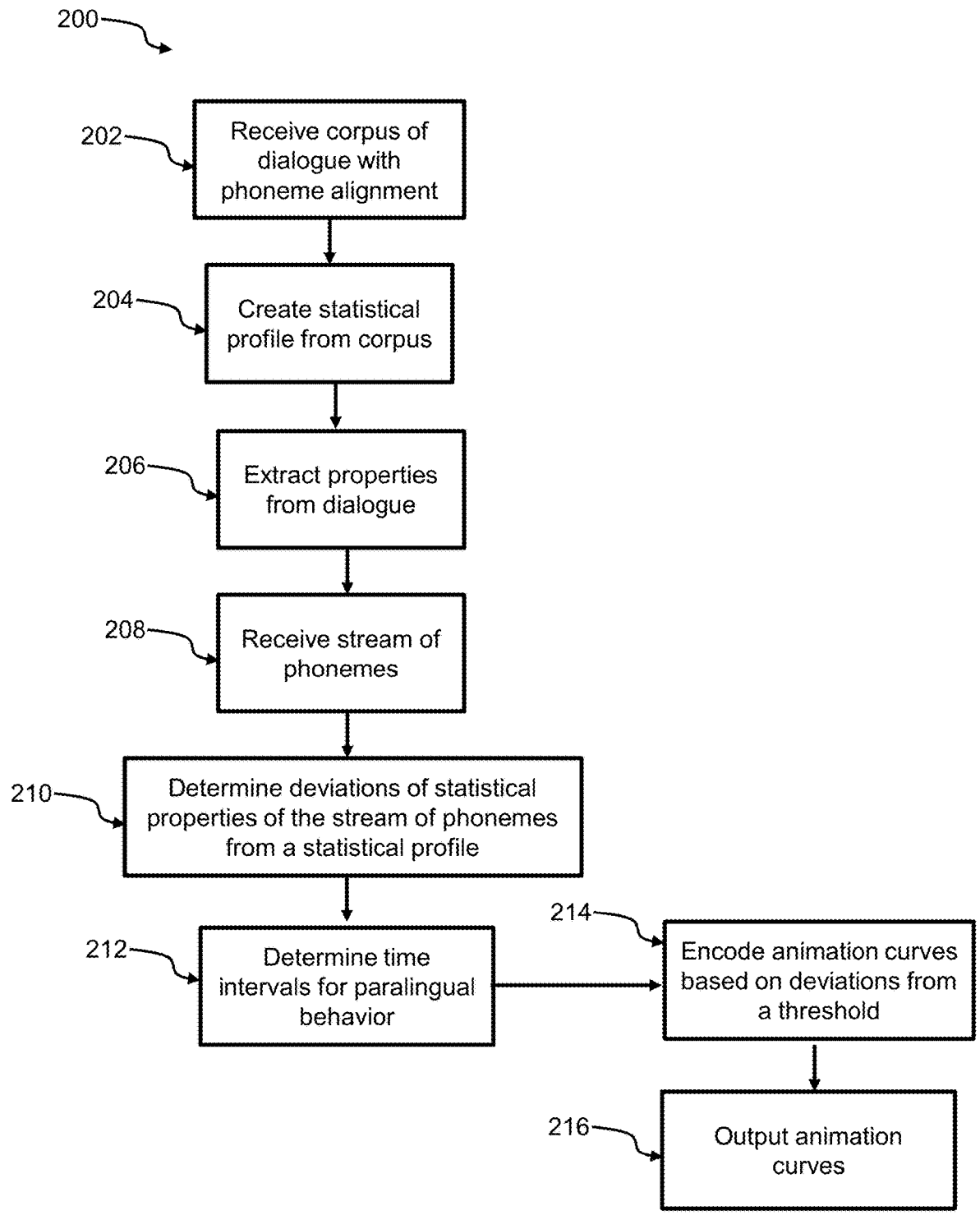
FIG. 2 is a flowchart of a method for triggering animated paralingual behavior from dialogue, according to an embodiment.

Turning to FIG. 2, a flowchart for a method 200 for triggering animated paralingual behavior from dialogue, in accordance with an embodiment, is shown. At block 202, at least a portion of a corpus of dialogue and associated phoneme alignment is received as input by the input module 102 from the input device 122 or from the storage device 124. The corpus of dialogue comprises one or more samples, where each sample comprises repeated or different utterances that are aligned with the phonemes. Each sample can comprise a sound element (such as a '.wav' file) and a corresponding textual element (such as a '.txt' file). In certain cases, the dialogue can be an audio file(s) that has been converted from speech to text, or textual dialogue transcripts. The dialogue and phoneme alignment can be based on synthetically generated dialogue or based on dialogue spoken by a real person.

In some cases, the system 100 does not have to wait for the entire corpus of dialogue to be received before triggering paralingual behaviors, as described herein, as long as there are enough samples in the corpus to provide sufficient statistical measures. In this way, the corpus of dialogue can be continually growing or changing. In this way, Bayesian inference can be used to update the statistical profile as the corpus grows or changes.

Phoneme alignment is understood to mean an order and duration of each phoneme given the inputted audio and transcript. For example, "The End" may be aligned as:
0.0 s-0.12 s D,
0.12 s-0.29 s UX0,
0.29-0.55 EH1,
0.55-0.61 n,
0.61-0.89 d.
in <t1(secs), t2(secs), phoneme>format.

The corpus of dialogue can include sound files (such as '.wav' files) containing audio of a single speaker, and a time-series of phonemes aligned to the sound file. In some cases, the speaker of the corpus of dialogue can be visually captured by one or more video or 3D motion capture devices. As described herein, the analysis module 104 can correlate different paralingual expressions in a speaker specific manner with quantities measured in the audio signal, and the synthesis module 106 can add these captured paralingual expressions to a facial pose repertoire to serve as paralingual behaviors.

At block 204, the analysis module 104 uses the inputted corpus of dialogue to create a statistical profile of the utterances. Each sample of dialogue is treated as a vocal signal that is processed to extract various tonal aspects, for example, volume and pitch. A time unit that can be used is the duration of each phoneme. For example, the mean pitch of the phoneme is determined, as well as the minima and maxima of each phoneme duration.

In most cases, the statistical profile is generated for speaker of a character based on a statistical analysis of the speaker of the corpus of dialogue. In some cases, the analysis module 104 distinguishes the same voice actor performing two or more different roles, because phoneme durations and sub-phoneme signals would be different between voices, as would the overall pitch, the volume of certain phonemes, and other properties.

The statistical profile for a given sample can include a matrix of extracted properties. For each property (e.g., {phoneme, consonant, vowel, plosive, fricative . . . or any other manner of articulation class}) across the received input, determine measured quantities (e.g., {mean, maxima, minima, stdev} for {pitch, intensity, duration}). In some cases, also separating stressed from unstressed sounds (if the language is a stressed language such as English (stressed), but not unstressed languages such as Korean).

Properties can include one or more of:
number of phonemes;
number of vowels;
number of consonants;
number of phonemes with associated intensity data;
number of vowels with associated intensity data;
number of consonants with associated intensity data;
number of phonemes with associated pitch data;
number of vowels with associated pitch data;
number of consonants with associated pitch data;
number of phonemes with associated high frequency intensity data;
mean of the mean intensity values per phoneme;
intensity minima and maxima for phonemes;
mean of the mean pitch values per phoneme;
pitch minima and maxima for phonemes;
duration and mean duration;

high-frequency mean, minimum, and maximum;
mean, minimum, and maximum of sonorants;
mean, minimum, and maximum of fricatives; and
number, mean, minimum, and maximum of plosives.

While the unit of detected stress is generally a phoneme, the detection by the analysis module 104 could be at a sub-phoneme level; such as at initial onset or decay of a phoneme. In other cases, the detection by the analysis module 104 could be coarser at a super-phoneme level; in which neighbouring phonemes in the same syllable or word are considered together.

For illustrative purposes, TABLE 1 illustrates an example output of the analysis module 104 for an example case. In the example of TABLE 1, t1 is a start time for an analyzed phoneme and t2 is an end time for the given phoneme. Measured quantities included Mean Pitch (Hz), Minimum Pitch (Hz) Maximum Pitch (Hz), Mean Intensity (dB), Minimum Intensity (dB) Maximum Intensity (dB), among other properties.

In some cases, the analysis module 104 performs the analysis on each file in the corpus to create the statistical profile. The statistical profile is effectively an amalgamation of the inputted statistics of the corpus of dialogue; for example, peak maximum pitch, peak pitch over all consonants, peak pitch over all vowels, peak pitch over all fricatives, peak pitch over all plosives, mean pitch, mean duration, mean volume, minimum volume, and the like, The analysis can then use standard deviation and/or variance to classify each linguistic category. In some cases, any connection between duration and other statistics can be stripped away. In this way, a representation is produced that is specific to a character and the person voicing that character, and such representation is used to determine when such character is in an "emphasis/emotional" trigger range of their speech.

The extraction of pitch, volume, shimmer, jitter, and other aspects of the phoneme are performed using any suitable approach in phonetics. For example, capturing the voice box

TABLE 1

| # | time1 | time 2 | mean Hz | min Hz | max Hz | mean dB | min dB | max dB | ... | Phoneme |
|---|-------|--------|---------|--------|--------|---------|--------|--------|-----|---------|
| 1 | 0.00 | 1.50 | 48.37 | 46.52 | 51.22 | 53.48 | 48.14 | 59.35 | ... | sil |
| 2 | 1.50 | 1.53 | 0.00 | -nil- | -nil- | 54.58 | 54.39 | 54.76 | ... | HH |
| 3 | 1.53 | 1.56 | 0.00 | -nil- | -nil- | 54.05 | 53.51 | 54.36 | ... | AH1 |
| 4 | 1.56 | 1.59 | 364.44 | 363.80 | 364.72 | 58.05 | 55.47 | 61.55 | ... | HH |
| 5 | 1.59 | 1.64 | 367.91 | 363.57 | 371.32 | 65.69 | 63.71 | 67.17 | ... | UW1 |
| 6 | 1.64 | 1.81 | 313.91 | 294.45 | 371.15 | 75.33 | 66.40 | 80.04 | ... | AA1 |
| 7 | 1.81 | 1.90 | 267.46 | 217.89 | 295.82 | 71.94 | 69.44 | 76.21 | ... | R |
| 8 | 1.90 | 2.04 | 185.96 | 171.58 | 221.96 | 65.97 | 63.61 | 70.45 | ... | Y |
| 9 | 2.04 | 2.07 | 173.55 | 172.41 | 174.09 | 62.20 | 61.30 | 62.86 | ... | UH1 |
| 10 | 2.07 | 2.21 | 111.35 | 55.85 | 173.88 | 57.18 | 53.94 | 60.85 | ... | HH |
| 11 | 2.21 | 2.25 | 276.40 | 273.46 | 281.04 | 60.54 | 56.72 | 65.65 | ... | W |
| 12 | 2.25 | 2.31 | 289.81 | 281.04 | 293.56 | 71.71 | 68.24 | 74.16 | ... | AH1 |
| 13 | 2.31 | 2.34 | 297.08 | 293.56 | 311.40 | 71.13 | 69.23 | 72.62 | ... | T |
| 14 | 2.34 | 2.37 | 316.70 | 311.40 | 317.84 | 70.74 | 69.95 | 71.71 | ... | ERO |
| 15 | 2.37 | 2.49 | 308.48 | 298.06 | 317.91 | 68.86 | 66.17 | 71.79 | ... | Y |
| 16 | 2.49 | 2.53 | 297.49 | 297.20 | 298.06 | 63.49 | 61.83 | 65.01 | ... | UW1 |
| 17 | 2.53 | 2.57 | 301.00 | 297.68 | 303.56 | 62.97 | 61.35 | 65.71 | ... | D |
| 18 | 2.57 | 2.72 | 285.35 | 205.05 | 304.46 | 69.40 | 67.19 | 71.93 | ... | UW1 |
| 19 | 2.72 | 2.78 | 195.85 | 189.12 | 205.05 | 64.90 | 62.50 | 67.06 | ... | IHO |
| 20 | 2.78 | 2.95 | 186.63 | 185.05 | 189.12 | 61.27 | 56.39 | 62.24 | ... | NG |
| 21 | 2.95 | 3.96 | 0.00 | -nil- | -nil- | 52.00 | 48.97 | 55.49 | ... | sp |

Using TABLE 1 as an example, the analysis module 104 can determine a standard deviation measurement by determining a mean pitch of all the received phonemes to generate a statistical profile. In some cases, using that standard deviation of the mean pitch for the phonemes, a subset statistic can be determined, such as the standard deviation of the mean pitch of vowels, or other mean pitch subsets. These determinations can also be performed for minimum, maximum, intensity and/or any other phoneme specific statistic. In some cases, the statistical profile also includes overall maxima and overall minima for phonemes (and, in some cases, for subsets, vowels, consonants, sonorants, fricatives, and the like).

At block 206, in some cases with additional phoneme data in the corpus of dialogue, the analysis module 104 extracts at least one property of the dialogue for each phoneme; for example, shimmer, jitter, duration, overtones, and the like. The analysis module 104 statistically classifies the one or more properties as a function of a sequence of phonemes associated with the dialogue. In some cases, the additional phoneme data can be received by a separate technique or software program, or received from the user. Advantageously, shimmer and jitter can be assessed within each phoneme without considering its place in context to the rest of the phonemes in a given utterance or in the corpus as a whole.

pitch and not the pitch of the friction of air through the teeth for a sound such as "ZZZebra".

In further cases, the analysis module 104, at blocks 204 and 206, can perform analysis at at a sub-phoneme level or at super-phoneme level.

At block 208, the input module 102 receives, as input, a synthesis dialogue comprising dialogue, with a stream of phonemes aligned to the dialogue, in order to be synthesized into a paralingual animation. The synthesis dialogue and associated phoneme alignment can be received from the input device 122 or from the storage device 124. The synthesis dialogue comprises utterances that are aligned with the phonemes. In certain cases, the synthesis dialogue can be an audio file(s) that has been converted from speech to text, or textual dialogue transcripts. The synthesis dialogue and phoneme alignment can be based on synthetically generated dialogue or based on dialogue spoken by a real person.

At block 210, the synthesis module 208 uses the synthesis dialogue and associated phoneme alignment to analyze a stream of the associated phonemes and determine statistical properties in relation to the statistical profile. In some cases, this analysis can be undertaken in real-time, or near real-time. In other cases, this analysis can be undertaken offline.

A deviation from the statistical properties for a particular phoneme in the stream of phonemes can be used to trigger a paralingual behavior. In some cases, this triggering can include enhancing or diminishing a paralingual behavior. In a particular case, the deviation is based on a measurement of standard deviation (stddev); for example, the paralingual behavior is triggered when the property is greater than one stand deviation, however other triggering values can be used as appropriate. In further cases, other deviation comparisons can be used; for example, when an absolute value of the difference is greater than a predetermined threshold.

In an example, one standard deviation can be used as a threshold which triggers an animation, while two standard deviations can trigger an even greater amplitude animation (a higher apex), such as at or very near a maximum of amplitude for the animation. These standard deviation thresholds can be any suitable value, or received from the user; such as reduced categorically to make for a more sensitive system which would trigger at lower pitch/volume which would give a more animated performance. Or the threshold can be increased creating higher thresholds, a less sensitive system, and a less animated performance. Generally, each phoneme is evaluated against the statistical profile in order, and if it is above or below the threshold, an animation is produced at the time of the phoneme and with an amplitude defined by the degree of the deviation.

In an example case, if an animation is triggered and is still in effect on the face and a threshold in the same direction is detected (i.e., a high pitch event closely followed by another high pitch event), the present level can be keyed 100-200 ms behind the phoneme start; and at the second phoneme start, a new apex can be keyed where the amplitude depends on the degree of deviation. Likewise, if an animation is triggered and is still in effect on the face and a threshold in the opposite direction is detected (i.e., a high pitch event closely followed by a low pitch event), the animation can be keyed at 100-200 ms behind the phoneme start; and at the phoneme start, a new apex that quickly reverses or that brings the feature back to neutral depending on the degree of deviation. Otherwise, each expression can decay to neutral naturally at a predetermined rate.

In some cases, for each type of paralingual behaviour, an appropriate trigger or combination trigger can be selected and retrieved from the storage device 124, or received from a user via the input device 122. In an example, the dialogue of "Hey There" has no plosives, so it would contribute no plosive statistical influence on the statistical profile, and thus, the plosive statistics in the profile would not have any influence on animation of this dialogue. It does have voiced and unvoiced phonemes, vowels, etc. Thus, this dialogue would influence the creation of the statistical profile, by including its vowel measurement statistics to the determination of the mean, maximum, minimum, standard deviation, or the like, of the statistical profile. In this way, the statistical profile's vowel standard deviation could be used as a basis for a trigger threshold for the animation of its vowels. Thus, triggering various paralingual behaviors can use deviations of, for example, pitch, volume, duration, or the like; or combinations of these measurements, such as a pitch and volume combined threshold; or a conditional combination threshold, such as pitch and duration or volume and duration.

In some cases, because the statistical profile operates across a vector of sonic properties, each statistical property can be analyzed separately by the synthesis module 208, giving rise to multiple paralingual behaviors operating in parallel, or combined to produce composite paralingual activities. Thus, the synthesis module 208 can provide aggregation at the phoneme level. In an example, triggers for blinks can be different than triggers for eyebrows; so each can be triggered at different times, or the same time, depending on what statistic is used as a trigger. In an example, an eye squint can be combined with a brow furrow (i.e., angry brow) for an 'untrusting vigilant' expression, or conversely eye widening can be combined with a brow furrow for a 'truly furious about to strike' expression. Such combinations can be received from a user or combined as part of pre-set groupings.

In some cases, the synthesis of block 210 can also occur at a sub-phoneme level (such as the initial attack or final decay of the phoneme) to create a more refined activity. In other cases, the synthesis of block 210 can be aggregated across multiple phonemes; such as words or short phrases that could be used to map, for example, slurred speech to rolling, drunken eyes.

At block 212, in some cases, the synthesis module 208 can trigger a paralingual behavior from a number of candidate paralingual behaviors. In such cases, the statistical deviations can be associated with a number of paralingual behaviors and the synthesis module 208 can select among these candidates. In some cases, the selection can be a random selection. In other cases, the selection can be based on a time interval in which the paralingual behavior is to be animated within. As an example, a statistical deviation is associated with a number of candidate paralingual behaviors where a character licks their lips. For example, one candidate may be a paralingual motion clip with a tongue going back and forth a number of times, while another may be a single paralingual expression of the tongue sticking out between the lips. There may be a limited time interval for the paralingual behavior before the paralingual behavior should decay in favor of further dialogue. If such interval is small, the back and forth animation may be too long to fit in the interval, and in such case, the other candidate of sticking the tongue out satisfies the interval. In some cases, the synthesis module 208 can make such selection based on whether there is speech occurring during the paralingual behavior. In the above example candidates, if there is no speech then sticking the tongue out to lick lips is selectable and can be combined with the speech action units to produce the animation. If however, the character is saying a phone like AA at the same time, the tongue paralingual is not compatible and will not be selected. In other cases, the selection can be based on environmental factors. In another example, a paralingual hand gesture may not be selectable because the character is holding a cup of coffee at that time.

At block 214, the synthesis module 208 encodes the selected paralingual behaviors as animation curves, such as those that effect changes to the action units of the animated character.

In this way, when a paralingual behavior is triggered when a dialogue feature is detected to be statistically different from a mean behavior (such as a distance of one standard deviation), an associated paralingual pose can be selected from the database of candidates. This pose can include associated animation curves. In a particular case, animation of the paralingual behavior can be implemented as a deformation from a static pose to a destination pose of one or more Action Units or deformers; for example, furrowed brow, raised brow plus cheek raise, and the like. In this case, the animation curve maps a neutral pose to the paralingual behavior.

In some cases, the degree of statistical deviation can be related to a degree of modulation of the animation curve of the animated paralingual behavior. In some cases, several paralingual behaviors can be active simultaneously or sequenced.

In some cases, the visual appearance of the animated character can be defined digitally using a polygon mesh, i.e. a discrete set of points connected by geometric elements such as polygons. Other examples of geometric representation include parametric surfaces, subdivision surfaces, or implicit surfaces. This geometry can be animated by prescribing the motion of individual geometry points over time, or by functionally relating the motions of these points to a set of high-level parameters, sometimes referred to as a 'character rig'. A character rig for faces can include a set of target shapes defining various facial expressions, whose point positions are linearly combined using a set of blend shape weights. In other words, a character rig can be thought of as a function f that deforms a set of points $P=[p_1\ p_2\ \ldots\ p_m]$ (which can be arranged in a matrix of points) on the character geometry. The points on the character geometry can represent facial skin, hair, and other parts of the face (e.g., tongue and teeth), and/or invisible anatomy (e.g., skull or jawbone). The points P are deformed for a set of n rig parameters $W=[w_1, \ldots, w_n]$ (arranged as a vector). In the case of blend shapes, that often capture facial expression targets from the FACS (facial action coding system), corresponding to each weight $w_i$ is a target shape $T_i=[t_1\ t_2\ \ldots\ t_m]$ (which can be arranged in a matrix) with target geometric points $t_j$ corresponding to the undeformed character point $p_j$. For the points in matrix form, then $f(P,W)=P+\Sigma_{i=1}^{n} w_i*(T_i-P)$.

The character representation can have any number of parameters that can be further functionally defined using other parameters; for example, a viseme shape parameter might be defined as a functional combination of a set of FACS weighted expressions. Static expressions of the face or body can be produced by activating some subset of the rig parameter set W and expressions of the face or body can be animated as animation curves that define a value over time of those parameters.

In some cases, paralingual behavior can include paralingual motion and paralingual expression. Paralingual motion can be considered a set of animation curves that activate all or a subset of the parameter set of the face, where the state of such parameters at the beginning and end of the paralingual motion is substantially the same. As an example, a blink paralingual motion would activate a parameter that would animate an eye from its current open state to one that was closed and back to an open state. The open state before and after the blink is preferably the same but could be slightly more or less open than the prior state to appear less 'robotic'. Additionally, a paralingual motion can be parameterized such that it captures a range of timing and visual behavior of the paralingual action. For example, animation parameters can modulate the amplitude of a brow raise, its onset timing, or apex value.

In some cases, paralingual motion can be defined using a single paralingual expression. A paralingual motion is defined procedurally from a paralingual expression by animation curves for the parameters that take the character geometry, or a part of it, from a current state to the paralingual expression, and then after holding the expression for a period of time, animating the face back to its state before the paralingual expression. Paralingual expressions suffice to capture many common paralingual motions; for example, eye blinks, nostril flares, or brow furrows. However, single paralingual expressions may not be able to define more complex motions, for example, back and forth tongue motion of lip licking or a quivering lip pucker.

At block 216, the output module 110 outputs the generated animation curves to animate the character. In some cases, the paralingual behavior can be defined as the animation of a set of parameter curves; which can be pre-segmented into intervals of attack, sustain and decay to enable alignment of the motion with an associated animation interval.

Using the method 200, a paralingual behavior (as an expression or pose) can be defined using values for a subset $E=\{e_1, e_2, \ldots, e_k\}$ of the character rig parameters. The paralingual expression can be expressed by interpolating each $e_i$ from its current state to that of the paralingual expression over the attack phase. The expression is held over the sustain period and then interpolated back over the decay interval to the current state of that character at the end of the paralingual behavior. In some cases, the paralingual behavior can be overlaid relative to the current state of the character. For example, a paralingual motion of a head shaking left to right and back can be overlaid as a relative change to the parameters of a character head that may already be oriented left (or right).

This wide range, for example, between sexes and between adult and child groupings, which demonstrates the advantages of creating the statistical profile for a given speaker, both across speakers and within a single speaker. Determining outliers and expected behavior is also useful; for example, the high pitch emphasis of a person with a low voice, may not even reach the average pitch of another in their group (male, female, child). Vocal properties such as breathiness, sibilance, and/or vocal fry can interfere with proper determination of pitch and intensity; however, if the same person has vocal fry on the same phonemes, then the statistical profile will be useful in determining the norms of speech for that person.

Figure 3:
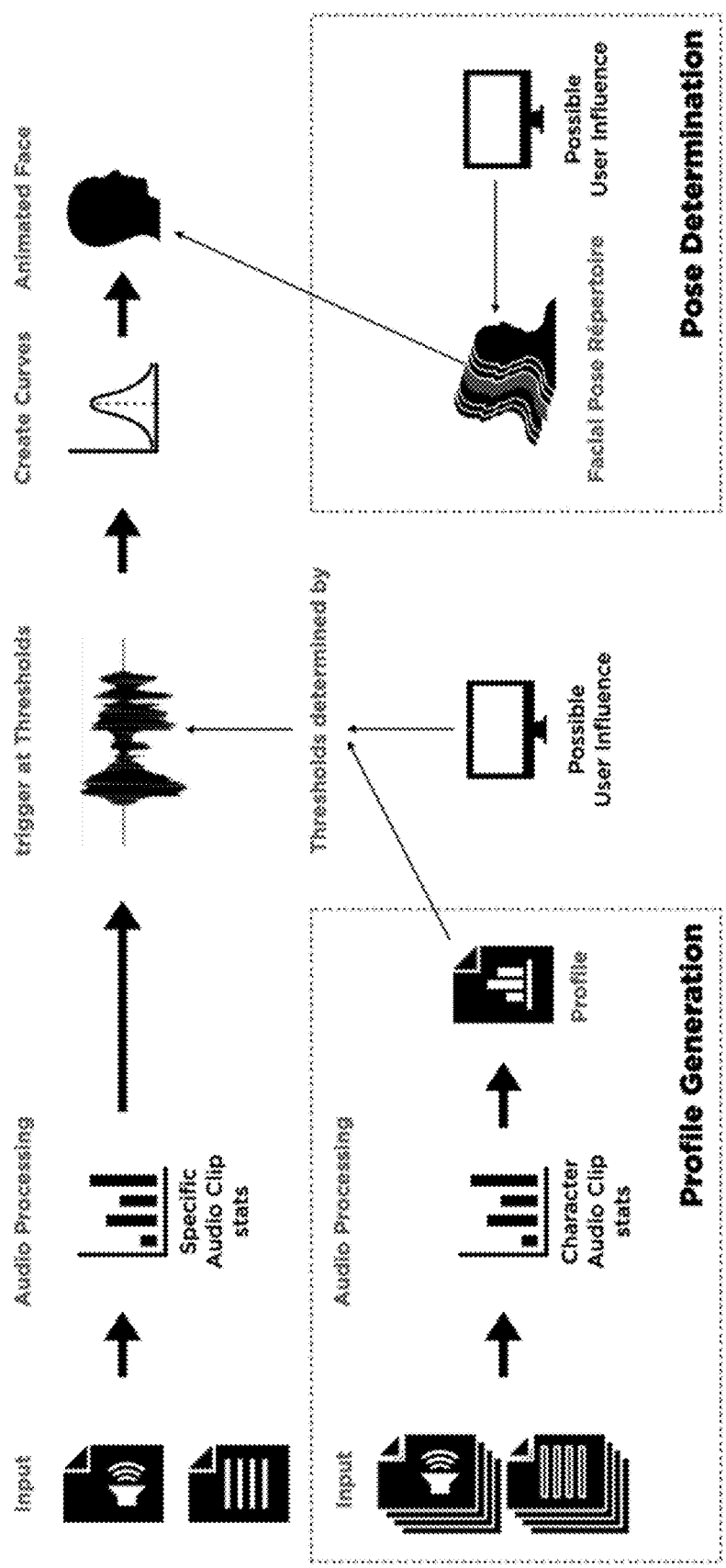
FIG. 3 illustrates an example diagrammatic overview of an example implementation of the system of FIG. 1.

FIG. 3 illustrates an example diagrammatic overview of the system 100. In a particular case, the system 100 provides an approach to analyze an audio signal to use a number of discrete trigger events that define at least one of attack, apex, sustain, and decay points of paralingual behavior. As described herein, a paralingual behavior can be triggered when a measurement associated with a particular phoneme (or class of phonemes) behavior crosses a matching threshold of said phoneme (or class of phonemes). For example, if a current phoneme is a 'B', a plosive-class phoneme, the duration, mean/min/max pitch, and mean/min/max intensity of this phoneme is compared to defined thresholds (mean, maximum, minimum, standard deviation) of all plosives in the statistical profile. If one threshold, or some combination of these thresholds, are crossed, a particular paralingual will be triggered; or if already triggered, it can be increased or decreased in intensity, or ended immediately. A database of associations between certain thresholds to respective triggered paralingual behaviors can be stored and retrieved from the storage device 124, or received from a user via the input device 122.

In an example, the paralingual behavior of animating brow raising (AU1+2) can be triggered by phoneme pitch increases above the mean in the statistical profile by one standard deviation. If while that paralingual is still triggered (somewhere between the apex and sustain or sustain and decay) the pitch should drop below the mean of the statistical profile, the brow can immediately decay to neutral level; but if that was one standard deviation below the mean, the brow not only would cease to raise, but the brow would furrow (AU4). In this way, the furrow animation would be animated in attack, then apex, then sustain, then decay. In another example, the user could provide input to produce a negative affect should a paralingual behavior be triggered, such as fear. When the threshold of one standard deviation above intensity mean is surpassed, the brows can be animated to be raised while the intensity is above one standard deviation. Soon after, a pitch threshold might be surpassed, in which case the inner brow plus furrow (worry lines) can be animated. In other cases, if pitch and intensity both simultaneously were one standard deviation above the mean, both animations could be triggered simultaneously.

The aggregate time intervals of these points can be used to define a duration of the paralingual behavior. Each of these can include one or more paralingual expressions, and in some cases, transition motion between the expressions. In most cases, the state of the animated character's geometry when the attack began is generally substantially the same as after the decay has ended. It is understood that small and natural differences in a character's state after a motion has been performed is permissible.

In some cases, a number of continuous signals to modulate the intensity and other parameters of the paralingual behavior can also be determined from the audio signal. In this way, properties of the dialogue can directly or indirectly be mapped to other continuous signals. For example, the continuous amplitude of the signal can drive animation of eye-brow furrowing, but the derivative of the signal might affect the velocity of animation of other parts of the face.

Using a database of paralingual behaviors, the most appropriate animation can be selected, if any. In an example, consider an animation curve, illustrated in FIG. 4, that is anchored at the background level (often neutral, or 0) at a minimum of 120 ms before the start of the triggering phoneme and to a maximum of 500 ms. The apex is the full expression of the paralingual behavior on the face (in some cases, mixing with a background expression). The paralingual behavior sustains for a period of time in arching down to 85% to 60% of it's apex value then transitions back to the background state for each part of the paralingual behavior, or to a lower than sustain/apex but higher than original background state if the paralingual definition, cognitive model, or emotional state indicates it should be. If another triggering event takes place, the new paralingual behavior will be animated over the previous paralingual behavior, with the old paralingual behavior as a background state of the new paralingual behavior.

In some cases, the paralingual behaviors can be combined with other animations to produce a verbal utterance. For example, trigger of a paralingual behavior, as described herein, can be used to trigger an associated sound. For example, if the paralingual behaviors of raising eyebrows, opening eyes, and opening mouth are triggered, the system 100 can also trigger a scoffing sound to be outputted. These associations can be retrieved from the storage device 124, or received from user input 122 via the input module 102.

Figure 4:
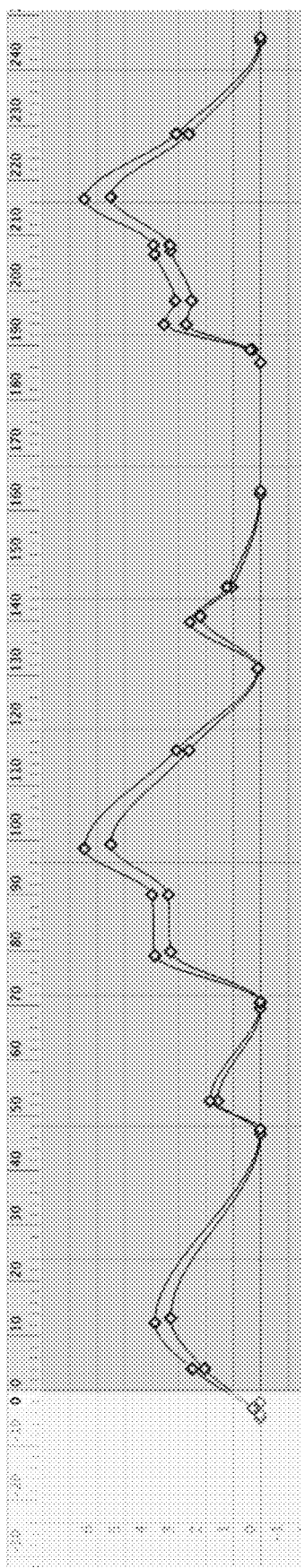
FIG. 4 illustrates an example of animation curves, in accordance with the system of FIG. 1.

In FIG. 4, frame 0 to frame 5 show a paralingual behavior from anchor to apex, and a second paralingual behavior is triggered before its conclusion at about frame 10. Frame 135 shows an uninterfered with paralingual behavior open anchor (frame 135.24), apex (frame 139.72), sustain (frame 146.08), closing anchor (frame 163.83). In some cases, the apex onset and closing anchor can be influenced by control received from a user via the input device 122. The amount the apex can be increased can be a percentage of such received value; lower than 100% to decrease the impact/expression, and greater than 100% to increase the intensity. The onset can be increased from 120 ms to 180 ms to 250 ms to 500 ms (or anything in-between) to decrease the rate of change from background state to new apex.

In some cases, the frequency of each triggering event can be increased and/or decreased by adding to, or subtracting from, respectively, the deviation. Lowering the threshold will create more triggering events, while adding to the threshold will decrease the triggering events.

Figure 5:
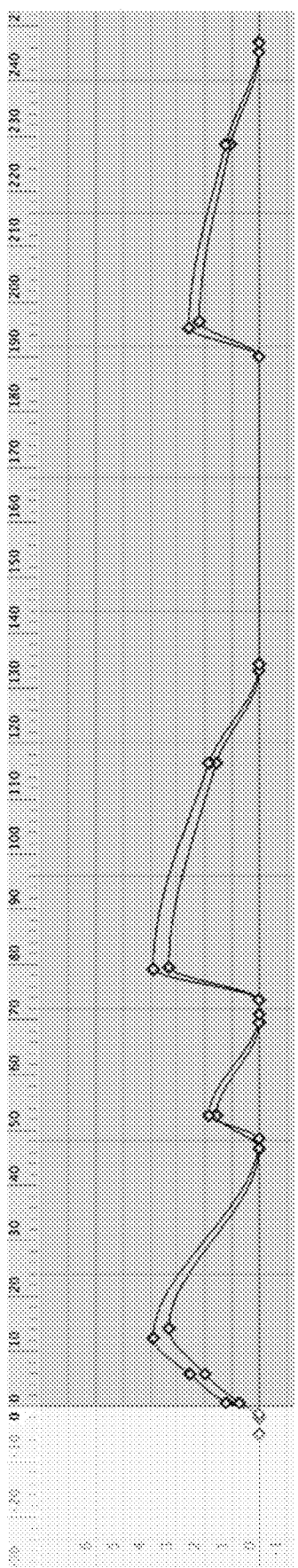
FIG. 5 illustrates another example of animation curves, in accordance with the system of FIG. 1.

FIG. 5 illustrates an example of increasing sensitivity thresholds by decreasing the pitch and or volume needed to trigger a paralingual behavior. Two lines are shown because the right and left brow is being animated. In some cases, slight randomization of apex intensity and/or anchor timing can be added between each run to prevent a "canned" look. In some cases, the synthesis module 208 can favour a certain side for animation to mimic a dominant side. Humans generally have a dominant half (either right or left) which gives them right-handedness and left-handedness; but can also apply to other parts like the face. Symmetry can look unnatural, so the dominant side and extent of domination can be determined, for example, by random or by user input.

In another example, consider animating the paralingual behavior of eye blinks. Blinks are influenced by a number of factors: dryness of eyes, bright lights, time since last blink, emotional states (such as fear or surprise), and in connection to speech to show emphasis, punctuation, or a cognitive switch. The analysis module 104 can perform audio signal analysis to determine potential start points, and duration times, for candidate blinks based on, in this example, emphasis and punctuation triggers. The synthesis module 108 then iterates over time, greedily applying as many paralingual blinks as possible, and additional non-paralingual blinks, if necessary; for example, based on the time elapsed since the last blink, and a predetermined blink frequency. The frequency can be user defined or determined from other factors like dryness of eyes or light intensity. In an example using blink frequency, blinks can trigger every 4.8 seconds. Blinks are parameterized and can be procedurally generated with respect to a randomized distribution around the time the eye takes to close (around 105 ms), remain closed (around 41 ms) and time to reopen (around 95 ms). A paralingual blink with the above parameterization can be applied to a candidate triggered interval if sufficient time has passed since the last blink and the blink duration can fit within the candidate interval. In another example, paralingual behaviors can also be selected from a repertoire of blinks, such as a motion-captured or animator keyframed double blink. This selected blink can be applied to a candidate blink duration, whether paralingual or due to other factors. In another example, eye expressions can be used to convey thought and emotion; for example, a squint for happiness, rolling eyes, lowering eyes, or looking away in thought.

Although the invention has been described with reference to certain specific embodiments, various modifications thereof will be apparent to those skilled in the art without departing from the spirit and scope of the invention as outlined in the claims appended hereto.

The invention claimed is:

1. A method for triggering animated paralingual behavior from dialogue, the method executed on at least one processor of a computing device, the method comprising:
   receiving at least a portion of a corpus of dialogue, the corpus of dialogue comprising a plurality of samples, each sample comprising dialogue with aligned sequences of phonemes or sub-phonemes;
   extracting properties of measured quantities for each sample;

generating a statistical profile by statistically classifying the extracted properties as a function of each sequence of phonemes or sub-phonemes;

receiving a stream of phonemes or sub-phonemes and triggering paralingual behavior when the properties of any of the phonemes or sub-phonemes deviate from the statistical profile beyond a predetermined threshold;

outputting the triggered paralingual behavior for animation.

2. The method of claim 1, wherein when the properties of any of the phonemes or sub-phonemes deviate from the statistical profile beyond a predetermined threshold comprises determining standard deviation between the phonemes or sub-phonemes and the statistical profile and triggering paralingual behavior when the standard deviation is above the predetermined threshold.

3. The method of claim 2, wherein the degree of statistical deviation is correlated with a degree of modulation for the paralingual behavior.

4. The method of claim 1, wherein the measured quantities comprise at least one of quantity, mean, maximum, minimum, and standard deviation.

5. The method of claim 1, wherein the properties comprise at least one of phonemes, vowels, consonants, sonorants, fricatives, plosives, intensity, pitch, and duration.

6. The method of claim 5, wherein the properties further comprise at least one of shimmer, jitter, duration, and overtones.

7. The method of claim 1, wherein each property is analyzed separately and the deviation from the statistical profile of each property is used to trigger a separate respective paralingual behavior.

8. The method of claim 1, further comprising receiving the predetermined threshold from a user.

9. The method of claim 1, wherein outputting the triggered paralingual behavior further comprises determining and outputting animation curves for the triggered paralingual behavior that alter geometry of an animated character from a current state to the triggered paralingual behavior, hold the paralingual behavior for a period of time, and alter the geometry of the animated character back to a state prior to the paralingual behavior.

10. The method of claim 1, wherein triggering the paralingual behavior comprises selecting a paralingual behavior from a database of potential paralingual behaviors.

11. A system for triggering animated paralingual behavior from dialogue, the system having one or more processors and a data storage device, the one or more processors in communication with the data storage device, the one or more processors configured to execute:

an input module to receive at least a portion of a corpus of dialogue, the corpus of dialogue comprising a plurality of samples, each sample comprising dialogue with aligned sequences of phonemes or sub-phonemes;

an analysis module to extract properties of measured quantities for each sample and generate a statistical profile by statistically classifying the extracted properties as a function of each sequence of phonemes or sub-phonemes;

a synthesis module to trigger paralingual behavior based on a stream of phonemes or sub-phonemes received by the input module when the properties of any of the phonemes or sub-phonemes deviate from the statistical profile beyond a predetermined threshold; and an output module to output the triggered paralingual behavior for animation.

12. The system of claim 11, wherein when the properties of any of the phonemes or sub-phonemes deviate from the statistical profile beyond a predetermined threshold comprises determining standard deviation between the phonemes or sub-phonemes and the statistical profile and triggering paralingual behavior when the standard deviation is above the predetermined threshold.

13. The system of claim 12, wherein the degree of statistical deviation is correlated with a degree of modulation for the paralingual behavior.

14. The system of claim 11, wherein the measured quantities comprise at least one of quantity, mean, maximum, minimum, and standard deviation.

15. The system of claim 11, wherein the properties comprise at least one of phonemes, vowels, consonants, sonorants, fricatives, plosives, intensity, pitch, and duration.

16. The system of claim 15, wherein the properties further comprise at least one of shimmer, jitter, duration, and overtones.

17. The system of claim 11, wherein each property is analyzed separately and the deviation from the statistical profile of each property is used to trigger a separate respective paralingual behavior.

18. The system of claim 11, wherein the input module further receives the predetermined threshold from a user.

19. The system of claim 11, wherein the synthesis module further determines animation curves for the triggered paralingual behavior that alter geometry of an animated character from a current state to the triggered paralingual behavior, hold the paralingual behavior for a period of time, and alter the geometry of the animated character back to a state prior to the paralingual behavior, and wherein the output module outputs the animation curves.

20. The system of claim 11, wherein triggering the paralingual behavior comprises selecting a paralingual behavior from a database of potential paralingual behaviors.

* * * * *